United States Patent
Bleeker et al.

(10) Patent No.: US 10,487,957 B2
(45) Date of Patent: Nov. 26, 2019

(54) FLUID VALVES

(71) Applicant: Delavan Inc, West Des Moines, IA (US)

(72) Inventors: Daniel E. Bleeker, Ankeny, IA (US); Francis P. Marocchini, Somers, CT (US)

(73) Assignee: Delavan Inc., West Des Moines, IA (US)

( * ) Notice: Subject to any disclaimer, the term of this patent is extended or adjusted under 35 U.S.C. 154(b) by 718 days.

(21) Appl. No.: 14/825,474

(22) Filed: Aug. 13, 2015

(65) Prior Publication Data

US 2017/0045152 A1  Feb. 16, 2017

(51) Int. Cl.
*F16K 31/06* (2006.01)
*F16K 31/00* (2006.01)
*F02C 7/232* (2006.01)
*F16K 49/00* (2006.01)

(52) U.S. Cl.
CPC ............ *F16K 31/002* (2013.01); *F02C 7/232* (2013.01); *F16K 31/06* (2013.01); *F16K 31/0665* (2013.01); *F16K 49/00* (2013.01); *F05D 2260/20* (2013.01)

(58) Field of Classification Search
CPC .... F16K 49/00; F16K 31/0606; F16K 49/005; F16K 49/007; F16K 31/0651
USPC ................................. 137/339, 340; 335/300
See application file for complete search history.

(56) References Cited

U.S. PATENT DOCUMENTS

| 3,695,037 | A |   | 10/1972 | Alverani |
| 4,191,061 | A |   | 3/1980 | Miller et al. |
| 4,585,028 | A | * | 4/1986 | Kawabata ........... F16K 31/0606 137/625.48 |
| 4,708,160 | A | * | 11/1987 | Sharp ..................... F16K 17/40 137/368 |
| 5,404,709 | A |   | 4/1995 | MacLean et al. |
| 6,786,049 | B2 |   | 9/2004 | Parsons et al. |

(Continued)

FOREIGN PATENT DOCUMENTS

| EP | 0371225 A2 | 6/1990 |
| EP | 2014989 A2 | 1/2009 |

(Continued)

OTHER PUBLICATIONS

DE 1239537 B; Lansky et al.; Apr. 27, 1967; Original and Translation.*

(Continued)

*Primary Examiner* — Marina A Tietjen
*Assistant Examiner* — Paul J Gray
(74) *Attorney, Agent, or Firm* — Locke Lord LLP; Daniel J. Fiorello; Joshua L. Jones

(57) ABSTRACT

A fluid valve use in a turbomachine in a high temperature location includes a fluid inlet, a fluid outlet, a fluid circuit defined between the fluid inlet and the fluid outlet, and a solenoid including a solenoid casing. The solenoid is disposed between the fluid inlet and fluid outlet. The solenoid is configured to move a valve member between a closed position, at least one partially open position (e.g., any number of suitable positions), and a fully open position to selectively meter fluid flow through the fluid circuit. The fluid valve can include a valve casing, wherein the solenoid and valve member are disposed in the valve casing.

18 Claims, 12 Drawing Sheets

(56) References Cited

U.S. PATENT DOCUMENTS

| | | |
|---|---|---|
| 7,188,465 B2 | 3/2007 | Kothnur et al. |
| 7,739,873 B2 | 6/2010 | Venkataramani et al. |
| 8,483,931 B2 | 7/2013 | Williams et al. |
| 8,636,263 B2 | 1/2014 | Deaton et al. |
| 8,677,754 B2 | 3/2014 | Lueck et al. |
| 2006/0243758 A1 | 11/2006 | Parks et al. |
| 2009/0013693 A1 | 1/2009 | Ols et al. |
| 2012/0117972 A1 | 5/2012 | Goeke et al. |

FOREIGN PATENT DOCUMENTS

| | | |
|---|---|---|
| JP | S556608 U | 1/1980 |
| JP | S5726813 U | 2/1982 |
| JP | S62170464 U | 2/1982 |
| JP | S58128588 A | 8/1983 |
| JP | S59187179 A | 10/1984 |
| JP | S62172873 U | 11/1987 |
| JP | 2005114105 A | 4/2005 |

OTHER PUBLICATIONS

Partial European Search Report issued by the European Patent Office, dated Jan. 11, 2017, in corresponding European Patent Application No. 16183764.6.

Extended European Search Report issued by the European Patent Office, dated Apr. 11, 2017, in corresponding European Patent Application No. 16183764.6.

\* cited by examiner

FLUID VALVES

BACKGROUND

1. Field

The present disclosure relates to valves, more specifically to fuel valves (e.g., for use with turbomachines).

2. Description of Related Art

Fuel control for a gas turbine engine is traditionally accomplished by a fuel metering valve and a flow dividing function upstream of the fuel nozzles. Such systems have multiple manifolds supplying fuel to the fuel nozzles at differing flow rates. However, traditional turbomachine systems do not use electronic fuel valves (e.g., solenoid valves) due to the thermal conditions that the valves are exposed to and since there has yet to be a solution for thermally regulating such electronic fuel valves.

Such conventional methods and systems have generally been considered satisfactory for their intended purpose. However, there is still a need in the art for improved fuel valves (e.g., for turbomachines). The present disclosure provides a solution for this need.

SUMMARY

In accordance with at least one aspect of this disclosure, a fluid valve use in a turbomachine in a high temperature location includes a fluid inlet, a fluid outlet, a fluid circuit defined between the fluid inlet and the fluid outlet, and a solenoid including a solenoid casing. The solenoid is disposed between the fluid inlet and fluid outlet. The solenoid is configured to move a valve member between a closed position, at least one partially open position (e.g., any number of suitable positions), and a fully open position to selectively meter fluid flow through the fluid circuit. The fluid valve can include a valve casing, wherein the solenoid and valve member are disposed in the valve casing.

The fluid circuit can include at least one thermal regulation portion to thermally regulate the solenoid temperature. The thermal regulation portion of the fluid circuit can be defined around at least a portion of the circumference of the solenoid to thermally regulate the solenoid. In certain embodiments, the fluid circuit can be defined more than about 330 degrees around the solenoid or any other suitable amount around the solenoid.

The thermal regulation portion of the fluid circuit can be defined by an inner wall of the valve casing and an outer wall of the solenoid casing. The solenoid casing can include a blocking feature protruding therefrom and contacting the inner wall of the valve casing adjacent to the fluid inlet such that the fluid flows around the solenoid before entering a valve chamber housing the valve member.

The valve can include at least one thermal isolation pocket defined between a valve casing and an internal valve component. The internal valve component can be a spacer skirt. The at least one thermal isolation pocket can be defined downstream of the valve member.

The valve casing can include a body portion and a cap portion configured to be connected to the body portion. The solenoid can include an orientation feature extending from the solenoid casing, wherein the cap portion includes an orientation aperture configured to receive the orientation feature and orient the solenoid relative to the fluid inlet such that fluid must flow around the solenoid before entering the a valve chamber.

The cap portion can be configured to connect to the body portion in a predetermined orientation to orient the solenoid. For example, in certain embodiments, the cap portion and body portion can include a plurality of corresponding flanges that are asymmetrically spaced about a circumference thereof such that the cap portion mounts to the body portion in a single orientation. In certain embodiments, the orientation feature can house electrical wiring for the solenoid.

In accordance with at least one aspect of this disclosure, a fuel nozzle for a turbomachine can include a fluid valve as described above and a nozzle tip extending from the fluid valve downstream from the valve member, wherein the nozzle tip is configured to supply fluid to a turbomachine combustor.

In accordance with at least one aspect of this disclosure, a method of assembling a fluid valve can include assembling inner valve components, inserting the inner valve components into a valve casing body portion, orienting the inner valve components relative to a fluid inlet in the valve casing body portion, and securing the inner valve components within the valve casing body with a valve casing cap portion such that the valve casing cap portion receives an orientation feature to fix the orientation of the inner valve components relative to the fluid inlet.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
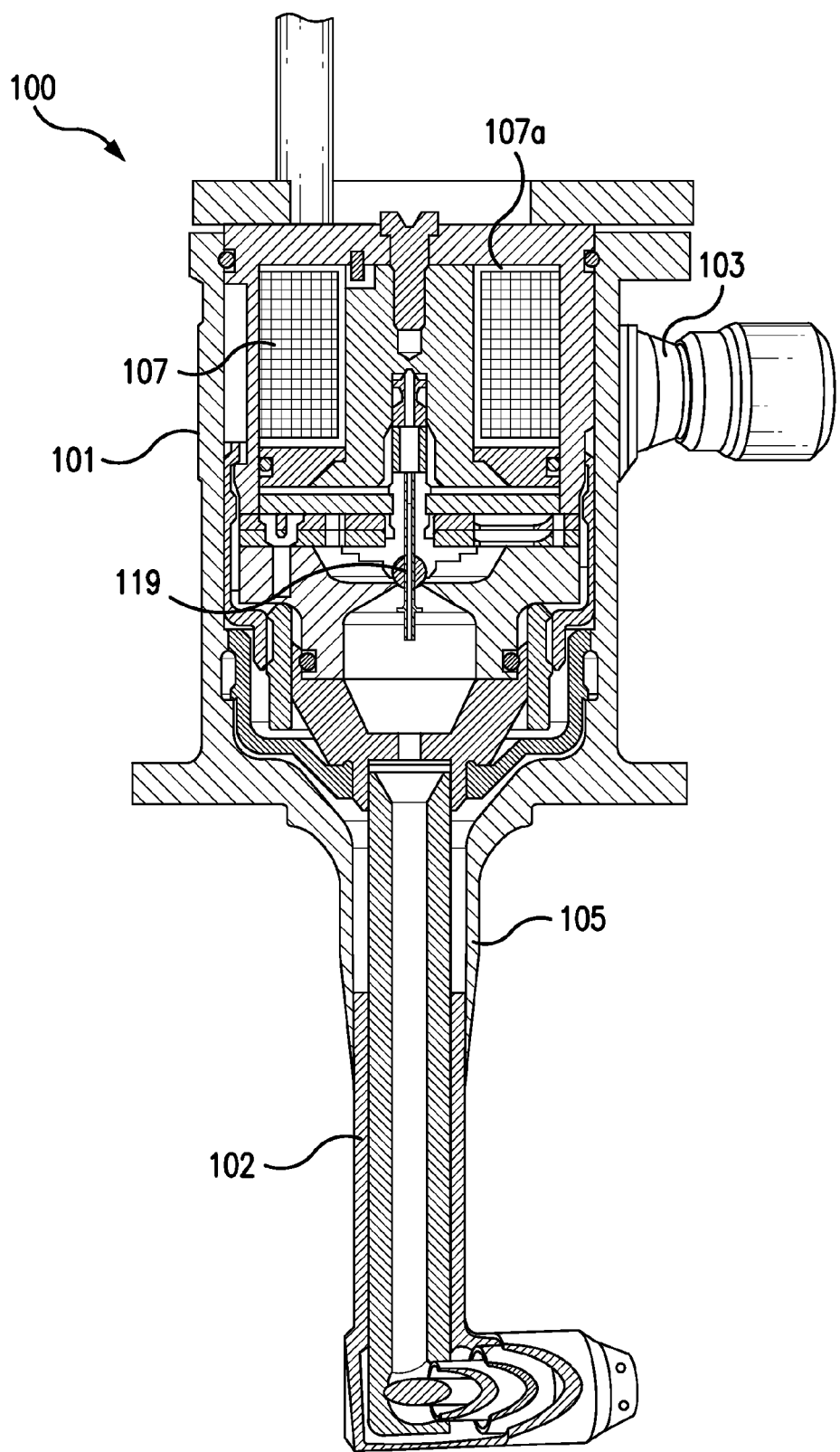
FIG. 1 is a cross-sectional elevation view of an embodiment of a fuel nozzle in accordance with this disclosure.

Reference will now be made to the drawings wherein like reference numerals identify similar structural features or aspects of the subject disclosure. For purposes of explanation and illustration, and not limitation, an illustrative view of an embodiment of a fuel nozzle in accordance with the disclosure is shown in FIG. 1 and is designated generally by reference character 100. Other embodiments and/or aspects of this disclosure are shown in FIGS. 2-6H. The systems and methods described herein can be used to meter fluid using electrical flow metering devices while thermally regulating the electrical components of the valve.

Figure 2:
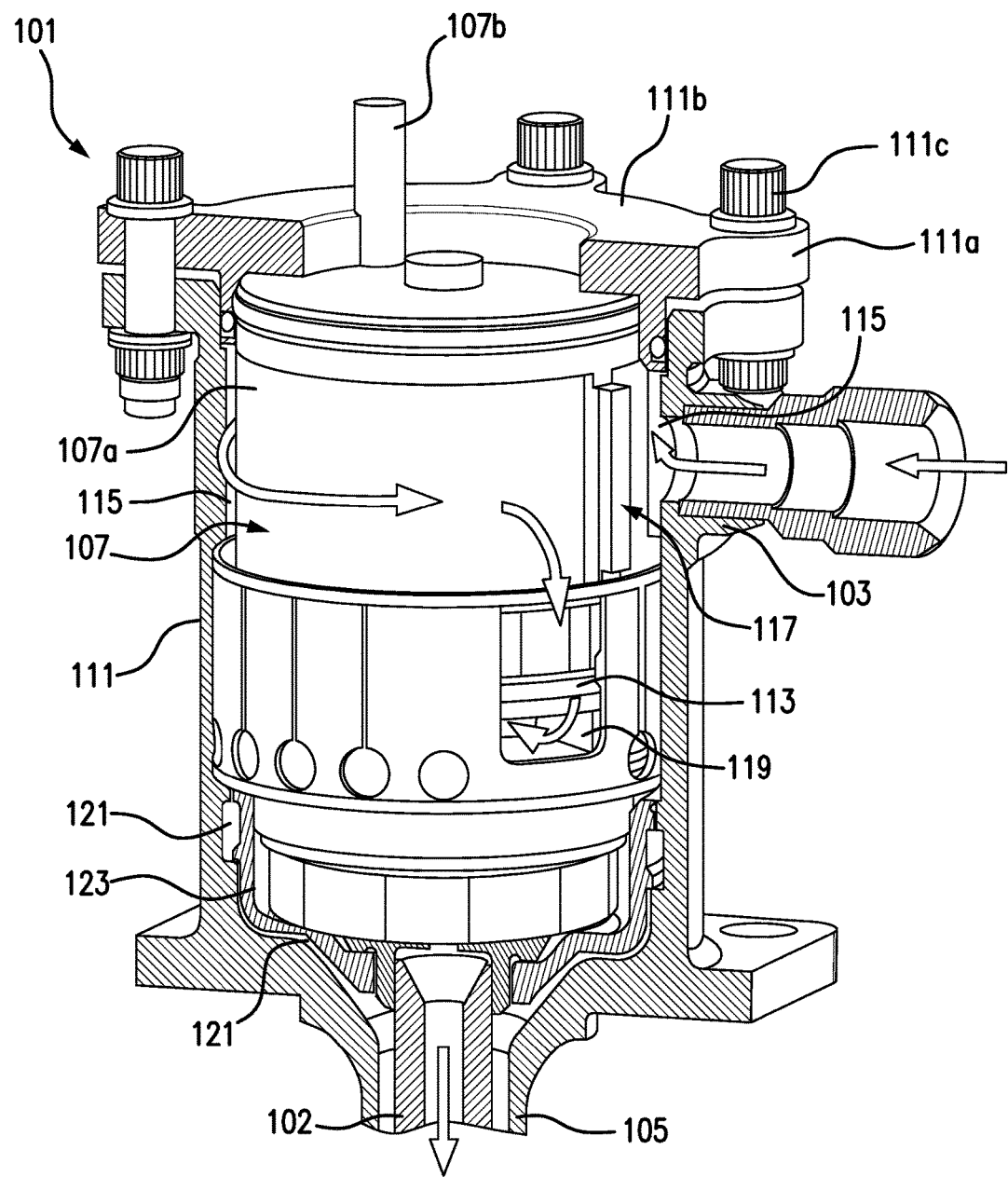
FIG. 2 is a perspective partial cross-sectional view of an embodiment of a fluid valve of the fuel nozzle of FIG. 1, shown in an open position wherein the fluid flow is shown schematically wrapping around a solenoid of the fluid valve.
Figure 3:
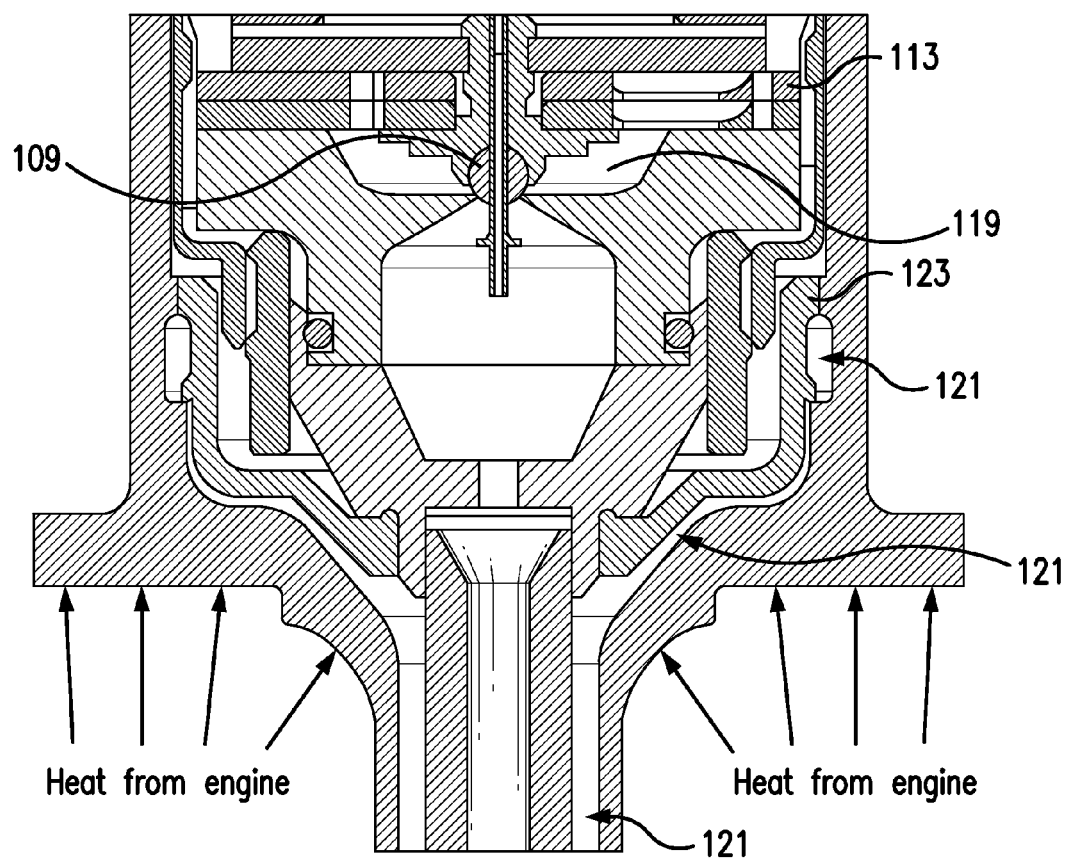
FIG. 3 is a cross-sectional elevation view of a lower portion of the fluid valve of FIG. 2, showing thermal isolation pockets defined by a spacer skirt.

Referring to FIGS. 1, 2, and 3, a fuel nozzle 100 includes a fluid valve 101 that has a fluid inlet 103 and a fluid outlet 105. A fluid circuit is defined between the fluid inlet 103 and the fluid outlet 105. While the fluid valve 101 is described as operating with a fuel nozzle 100, it is contemplated that fluid valve can be configured for use with any suitable fluid (e.g., coolant, air, fuel). Flow arrows in FIG. 2 show portions of an embodiment of a fluid circuit. The fluid valve 101 includes a solenoid 107 which has a solenoid casing 107a and is disposed between the fluid inlet 103 and fluid outlet 105.

Figure 5A:
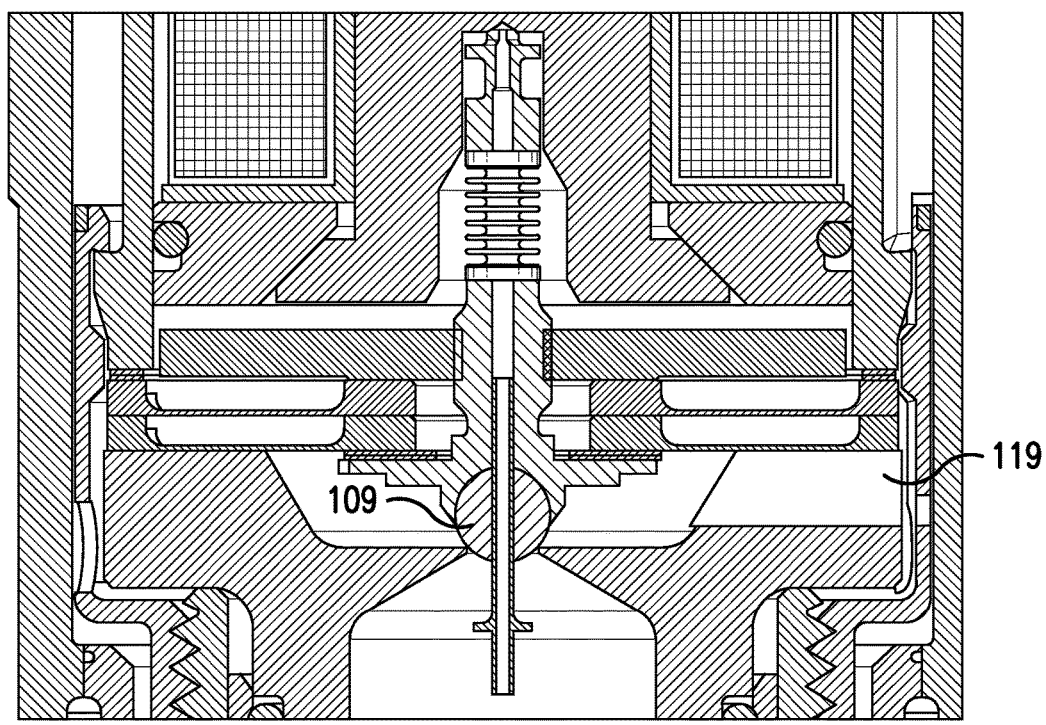
FIGS. 5A-5C are cross-sectional elevation views of the valve member of the fluid valve shown in a closed position, a partially opened position, and a fully opened position, respectively.
Figure 5B:
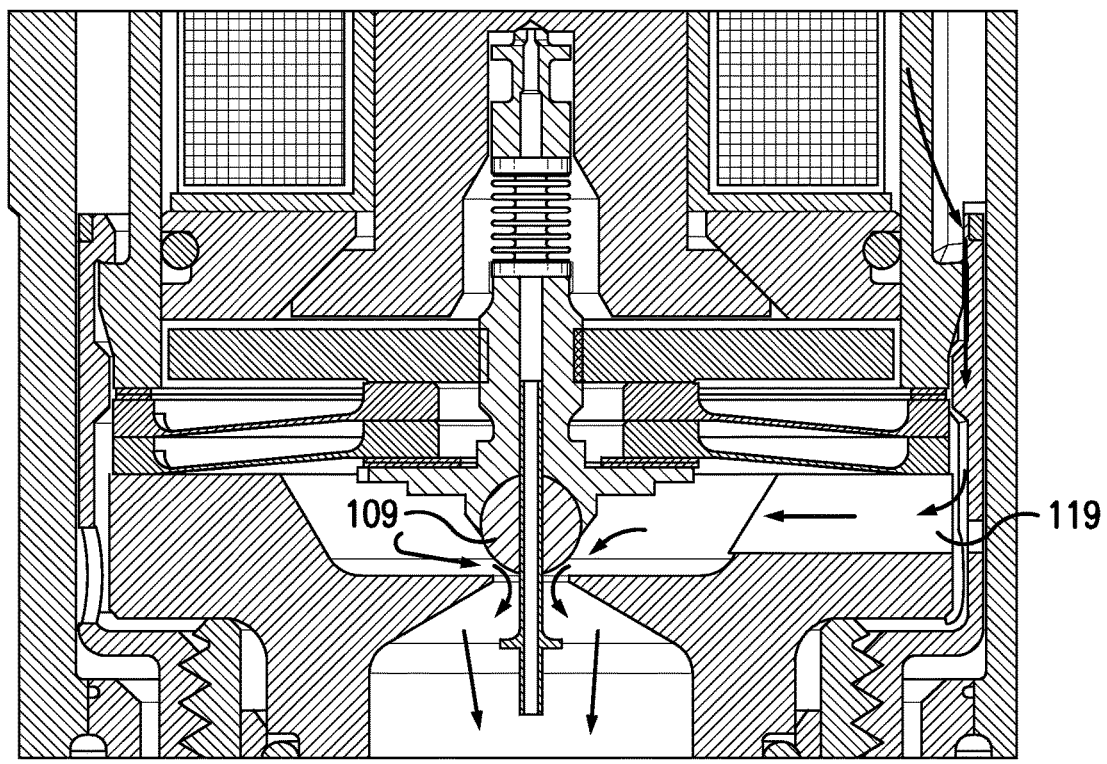
Figure 5C:
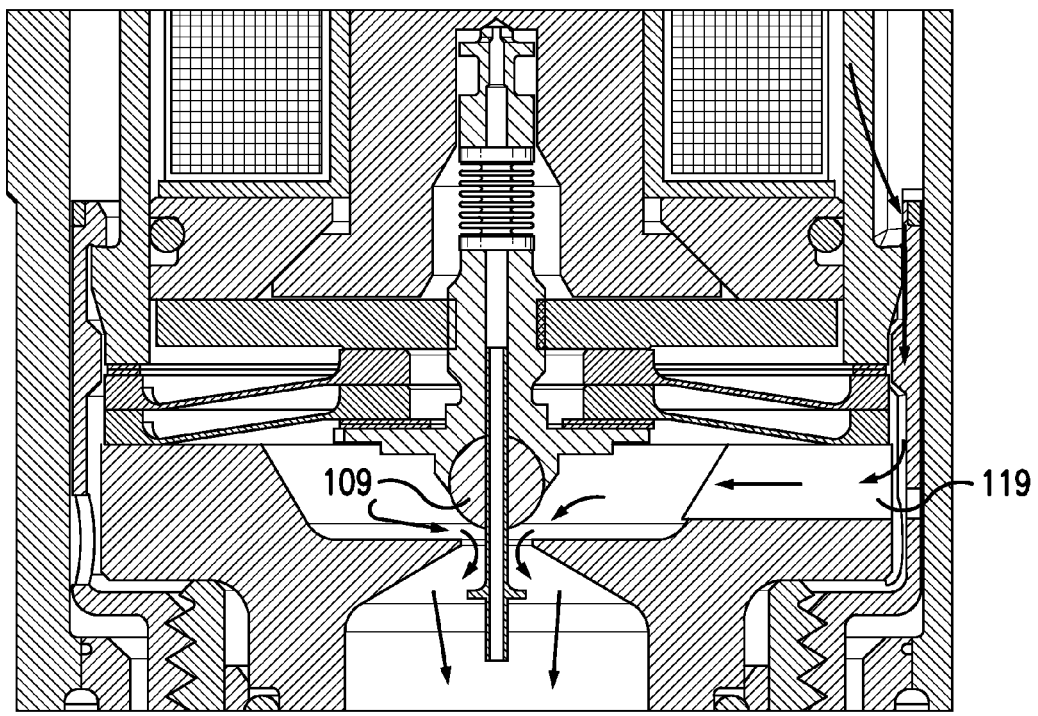

The solenoid 107 is configured to move a valve member 109 between a closed position (e.g., as shown in FIG. 5A), at least one partially open position (e.g., as shown in FIG. 5B), and a fully open position (e.g., as shown in FIG. 5C) to selectively meter fluid flow through the fluid circuit. For example, the valve member 109 can be configured to be moved and held in any suitable position (e.g., discreetly defined or not) between the closed position and the fully opened position.

As shown, the valve member 109 can include a ball valve assembly having any suitable design known in the art (e.g., mounted to flexures 113 configured to provide closure force bias). Any other suitable valve assembly for valve member 109 is contemplated herein.

The fluid valve 101 can include a valve casing 111 that holds the internal components of the valve 101 (e.g., the solenoid 107, valve member 109, and any other suitable valve components associated therewith). The valve casing 111 can include a body portion 111a and a cap portion 111b that is configured to be connected to the body portion 111a in any suitable manner (e.g., via fasteners 111c as shown).

The fluid circuit can include at least one thermal regulation portion 115 to thermally regulate the solenoid 107 temperature. The thermal regulation portion 115 of the fluid circuit can be defined around at least a portion of the circumference of the solenoid 107 to thermally regulate the solenoid 107. In certain embodiments, the thermal regulation portion 115 of the fluid circuit can be defined more than about 330 degrees around the solenoid or any other suitable amount around the solenoid (e.g., up to but not including 360 degrees, several rotations around solenoid 107 defined by one or more spiral channels in the solenoid casing 107a).

The thermal regulation portion 115 of the fluid circuit can be defined by an inner wall of the valve casing 111 and an outer wall of the solenoid casing 107a. As shown, the solenoid casing 107a can include a blocking feature 117 protruding therefrom and contacting the inner wall of the valve casing 111 adjacent to the fluid inlet 103 such that the fluid flows around the solenoid 107 before entering a valve chamber 119 housing the valve member 109. Restated, the blocking feature 117 can block fluid that is entering the fluid circuit from the inlet 103 from traveling directly to the valve chamber 119 which will cause the fluid to travel around the solenoid 107 (e.g., to absorb heat from the solenoid 107).

Alternatively and/or in addition to the thermal regulation portion 115 of the fluid circuit, the valve 101 can include at least one thermal isolation pocket 121 defined between a valve casing 111 and a suitable internal valve component. As shown, the internal valve component that creates one or more isolation pockets 121 can be a spacer skirt 123. The at least one thermal isolation pocket 121 can be defined downstream of the valve member 109 (e.g., toward a heat source) and/or in any other suitable location.

Figure 4A:
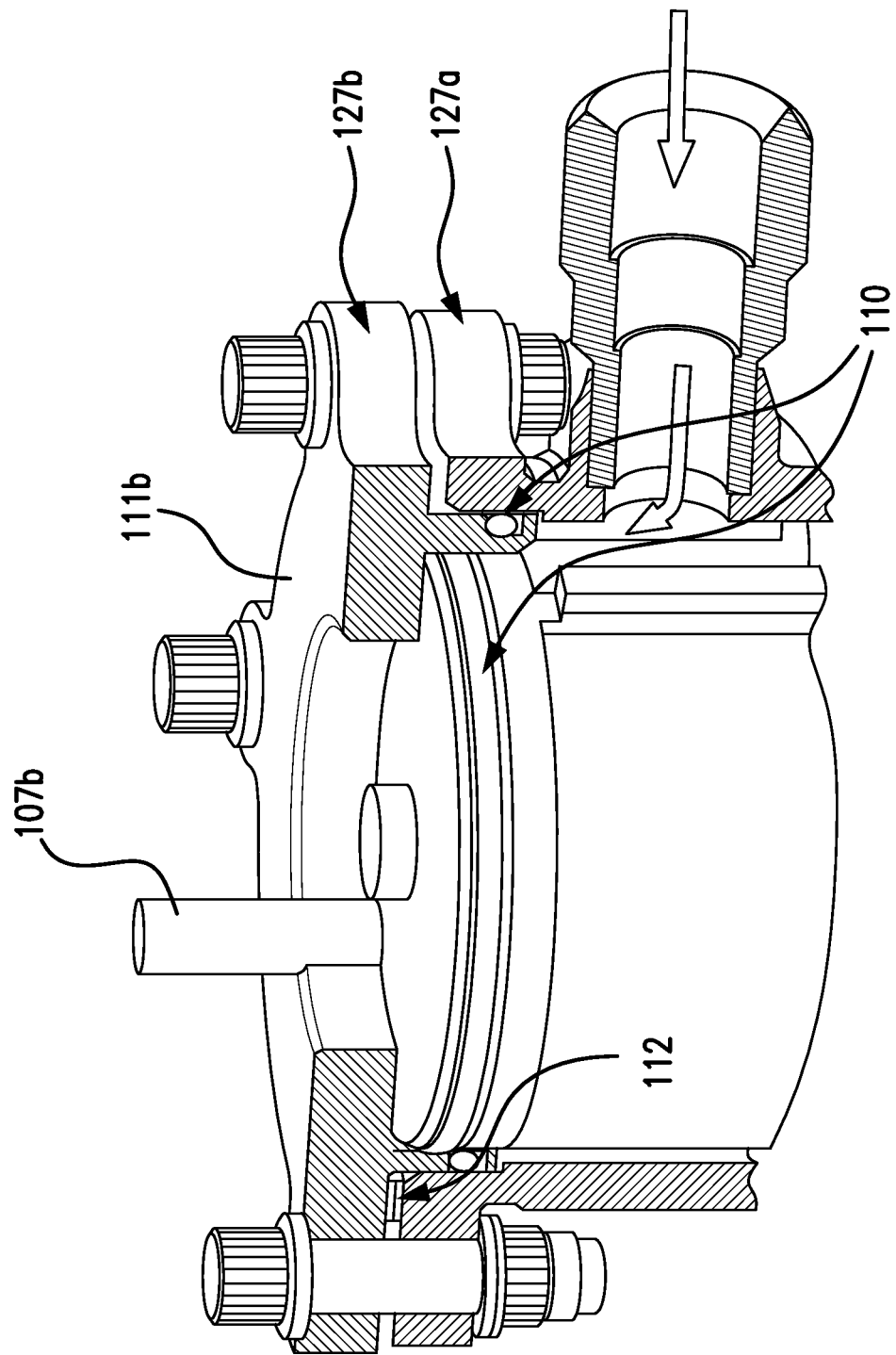
FIG. 4A is partial cross-sectional perspective view of an upper portion of the fluid valve of FIG. 2, showing a cap portion of the valve casing having an orientation aperture and secured to a body portion of the valve casing.
Figure 4B:
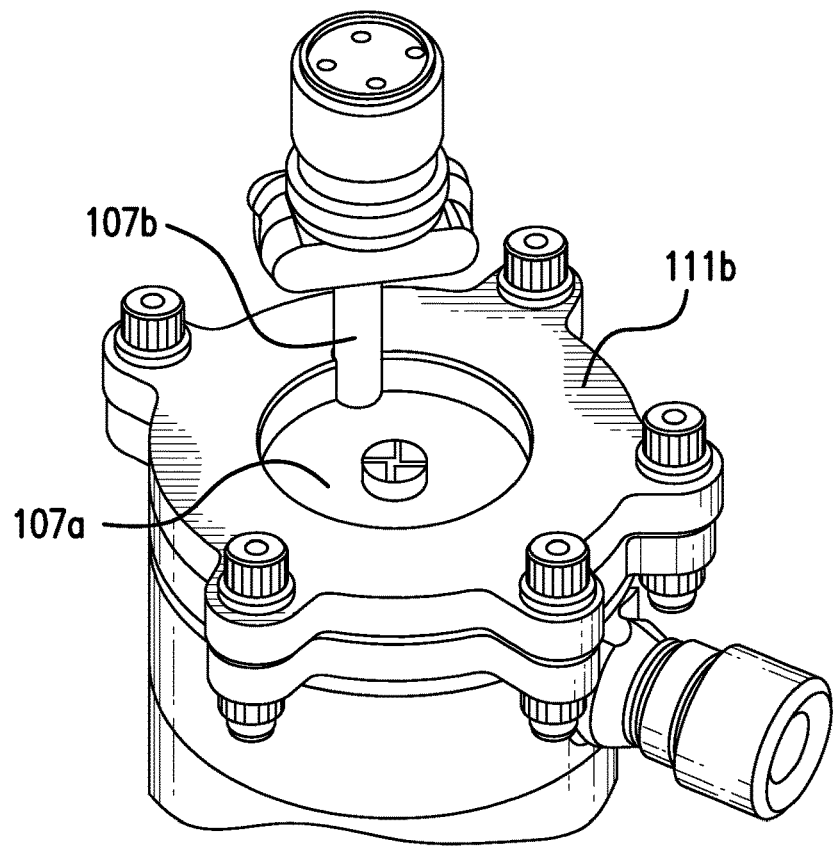
FIG. 4B is a perspective view of the upper portion of the fluid valve of FIG. 4.
Figure 4C:
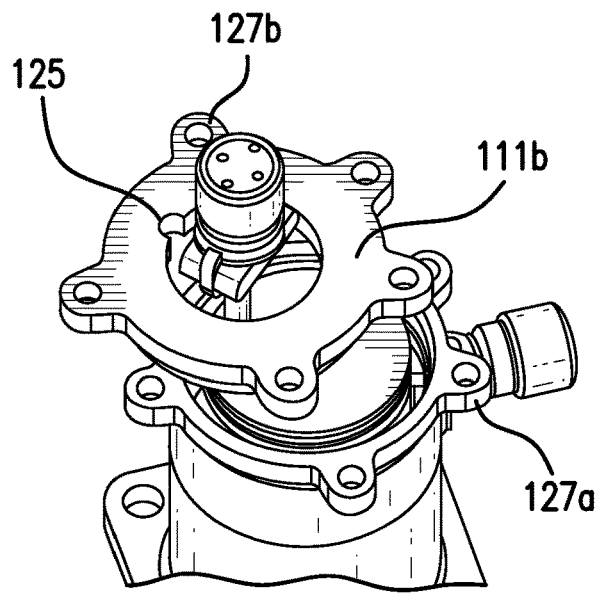
FIG. 4C is an exploded perspective view of the upper portion of the fluid valve of FIG. 4, showing the cap portion removed from the body portion of the valve casing.

Referring additionally to FIGS. 4A-4C, the solenoid 107 can include an orientation feature 107b extending from the solenoid casing 107a. The cap portion 111b includes an orientation aperture 125 configured to receive the orientation feature 107b and orient the solenoid 107 relative to the fluid inlet 103 such that fluid must flow around the solenoid 107 before entering the the valve chamber 119. In certain embodiments, the orientation feature 107b can house electrical wiring for the solenoid 107.

The cap portion 111b can be configured to connect to the body portion 111a in a predetermined orientation to orient the solenoid 107. For example, in certain embodiments, the cap portion 111b and body portion 111a can include a plurality of corresponding flanges 127a, 127b that are asymmetrically spaced about a circumference thereof such that the cap portion 111b mounts to the body portion 111a in a single orientation.

The cap portion 111b can be sealed to the solenoid 107 and/or the body portion 111a of the valve casing 111 in any suitable manner (e.g., o-rings 110). Additionally or alternatively, one or more shims 112 can be disposed between the cap portion 111b and the body portion 111c to control the compressive stress imparted to the solenoid 107 and/or other internal valve components.

The fuel nozzle 100 can include a nozzle tip 102 extending from the fluid valve 101 downstream from the valve member 109. The nozzle tip 102 can have any suitable shape and can be configured to supply fuel to a turbomachine combustor.

In accordance with at least one aspect of this disclosure, referring additionally to FIGS. 6A-6H a method of assembling a fluid valve 101 can include assembling inner valve components, inserting the inner valve components into a valve casing body portion 111a, orienting the inner valve components relative to a fluid inlet 103 in the valve casing body portion 111a, and securing the inner valve components within the valve casing body portion 111a with a valve casing cap portion 111b such that the valve casing cap 111b portion receives an orientation feature 107b to fix the orientation of the inner valve components relative to the fluid inlet 103.

Figure 6A:
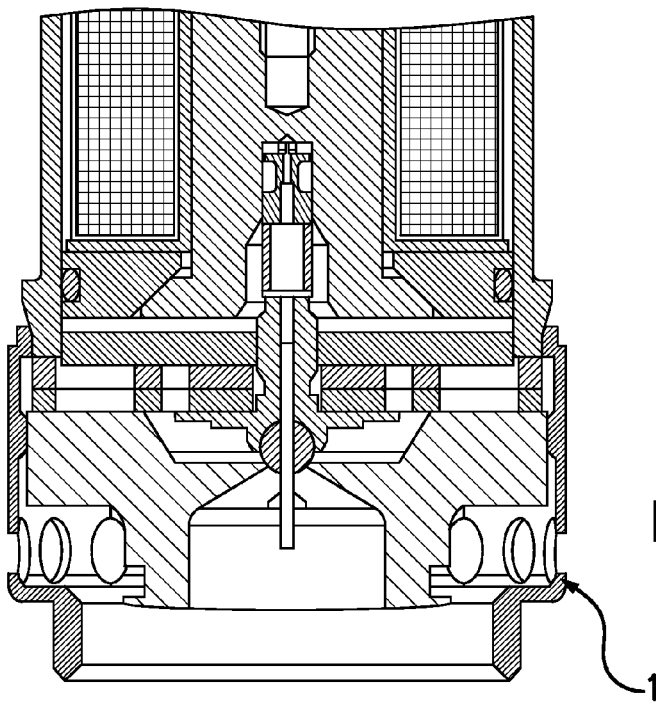
FIGS. 6A-6H illustrate an embodiment of an assembly process of a fluid valve and/or fuel nozzle in accordance with this disclosure.
Figure 6B:
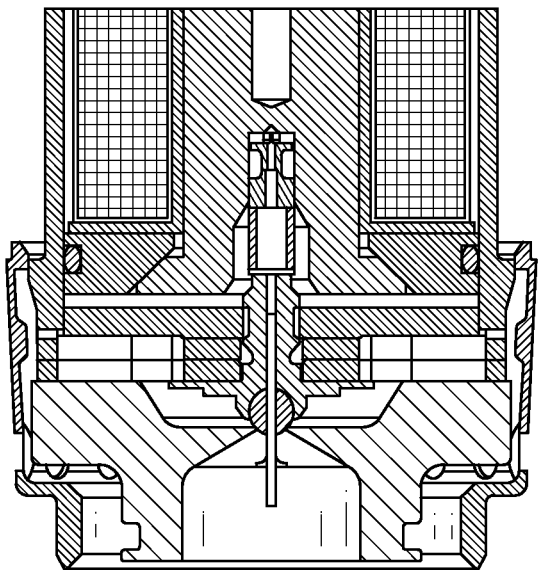
Figure 6C:
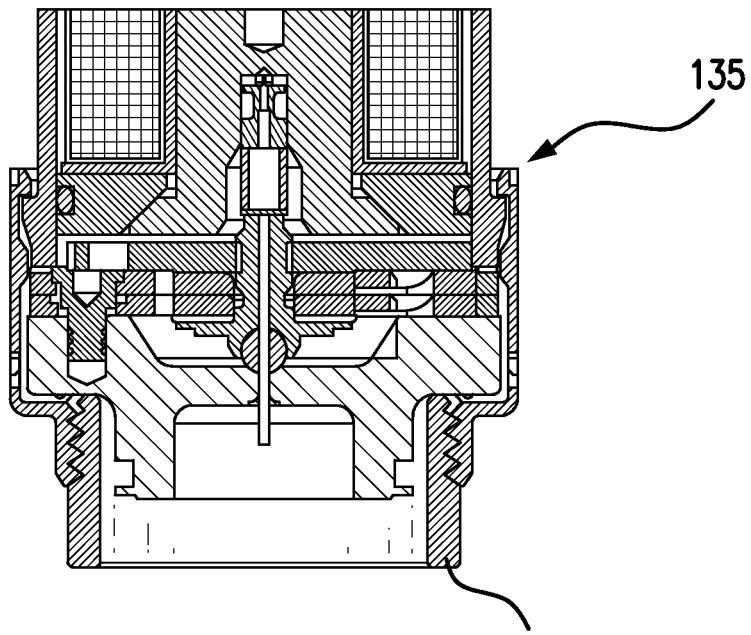
Figure 6D:
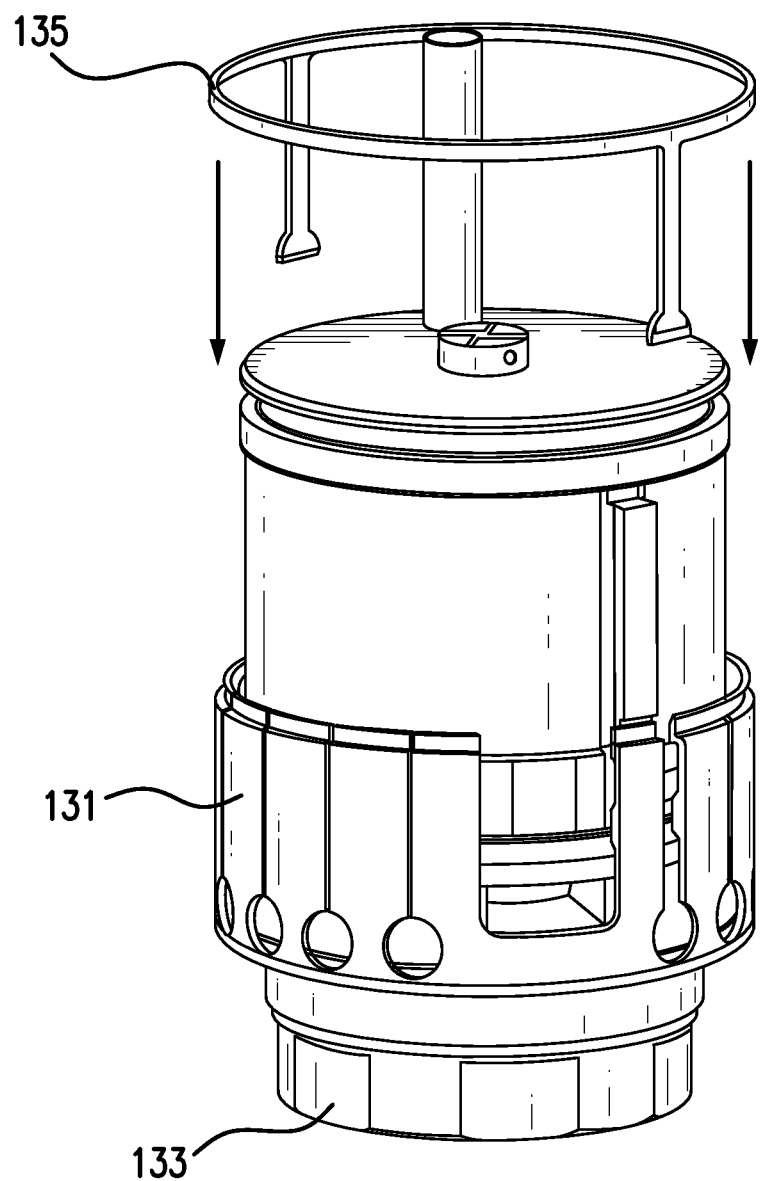
Figure 6E:
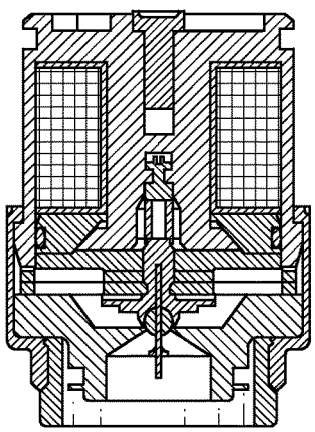
Figure 6F:
Figure 6F:
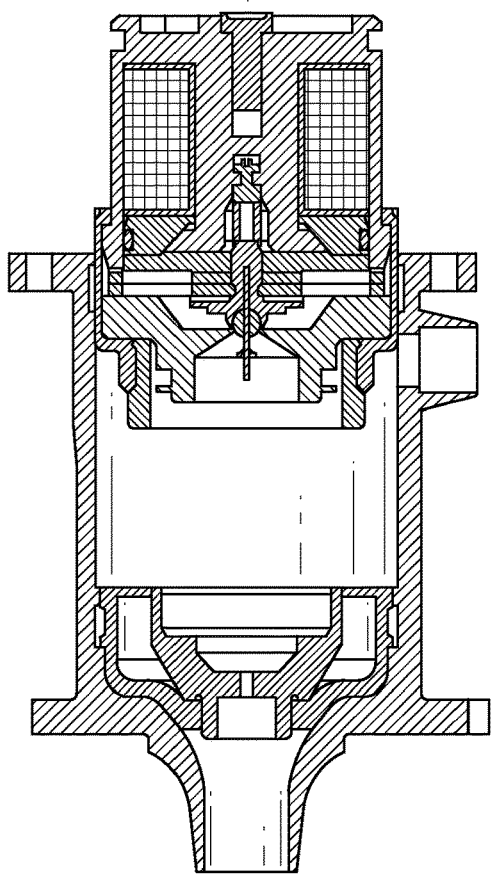
Figure 6G:
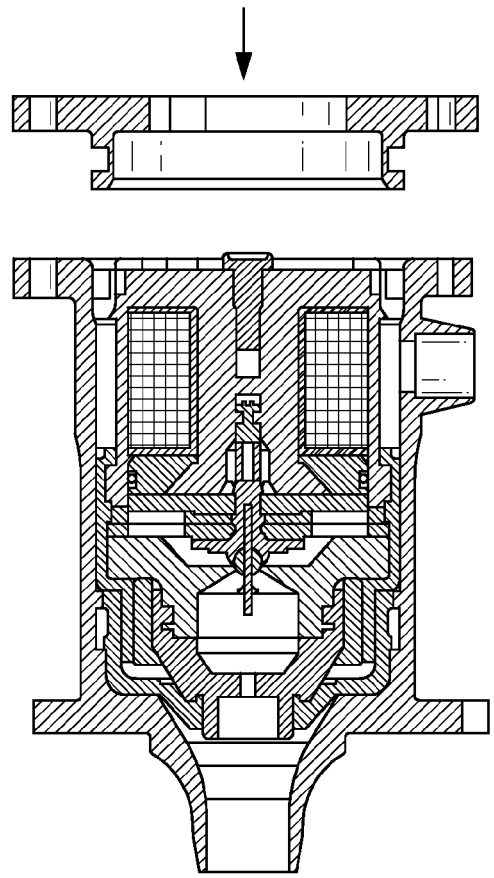
Figure 6H:
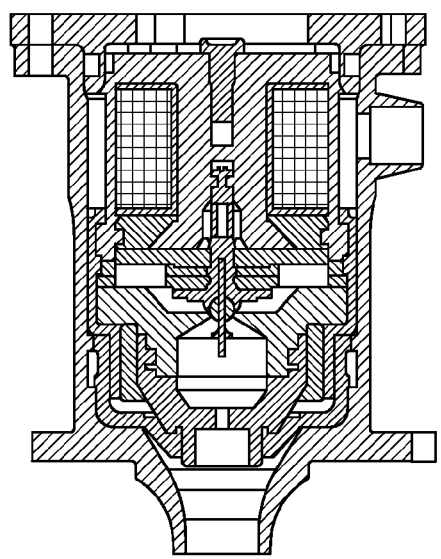

As shown in FIGS. 6A-6C, a snap lock cup 131 can be inserted over the valve member 109 and associated components to snap lock with a flange in the solenoid casing 107a. Referring to FIGS. 6C and 6D, the snap lock cup 131 can retain to the valve member 109 (and/or other suitable associated components) and the solenoid 107 in any suitable manner (e.g., via threaded lock nut 133 and lock ring 135).

Referring to FIG. 6E-6H, after assembly of the inner valve components as described above, the inner valve components can be inserted into the valve casing body portion 103, oriented to cause the fluid to flow around the solenoid 107, and locked into place by the cap portion 111b.

Utilizing the above, a single proportional electronic fluid metering valve can be integrated in a fuel nozzle 100 (e.g., for a turbomachine). Where heat would usually prevent the use of a solenoid so close to a combustor, the fluid valve 101 has the thermal regulation portion 115 of the fluid circuit that cools the solenoid 107 (and/or other electronics). The valve 101 can be configured as a removable component from the fuel nozzle 100 (e.g., for calibration, repair, and/or replacement).

The methods and systems of the present disclosure, as described above and shown in the drawings, provide for fuel nozzles and valves with superior properties including thermal regulation. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A fluid valve for use in a turbomachine in a high temperature location, comprising:
   a fluid inlet;
   a fluid outlet;
   a fluid circuit defined between the fluid inlet and the fluid outlet; and
   a solenoid including a solenoid casing and disposed between the fluid inlet and fluid outlet, the solenoid configured to move a valve member between a closed position, at least one partially open position, and a fully open position to selectively meter fluid flow through the fluid circuit, wherein the solenoid casing includes a blocking feature protruding therefrom and contacting the inner wall of the valve casing adjacent to the fluid inlet to form a single fluid path in the fluid circuit around a circumference of the solenoid such that the fluid flows around the circumference of the solenoid in one direction before entering a valve chamber housing the valve member.

2. The fluid valve of claim 1, further including a valve casing, wherein the solenoid and valve member are disposed in the valve casing.

3. The fluid valve of claim 2, wherein a thermal regulation portion of the fluid circuit is defined around at least a portion of the circumference of the solenoid to thermally regulate the solenoid.

4. The fluid valve of claim 3, wherein the fluid circuit is defined more than 330 degrees around the solenoid.

5. The fluid valve of claim 3, wherein the thermal regulation portion of the fluid circuit is defined by an inner wall of the valve casing and an outer wall of the solenoid casing.

6. The fluid valve of claim 1, further comprising at least one thermal isolation pocket defined between a valve casing and an internal valve component.

7. The fluid valve of claim 6, wherein the internal valve component is a spacer skirt.

8. The fluid valve of claim 7, wherein the at least one thermal isolation pocket is defined downstream of the valve member.

9. The fluid valve of claim 2, wherein the valve casing includes a body portion and a cap portion configured to be connected to the body portion.

10. The fluid valve of claim 9, wherein the solenoid includes an orientation feature extending from the solenoid casing, wherein the cap portion includes an orientation aperture configured to receive the orientation feature and orient the solenoid relative to the fluid inlet such that fluid must flow around the solenoid before entering the a valve chamber.

11. The fluid valve of claim 10, wherein the cap portion is configured to connect to the body portion in a predetermined orientation to orient the solenoid.

12. The fluid valve of claim 11, wherein the cap portion and body portion include a plurality of corresponding flanges that are asymmetrically spaced about a circumference thereof such that the cap portion mounts to the body portion in a single orientation.

13. The fluid valve of claim 10, wherein the orientation feature houses electrical wiring for the solenoid.

14. A fuel nozzle for a turbomachine, comprising:
   a fluid valve, including:
   a fluid inlet;
   a fluid outlet;
   a fluid circuit defined between the fluid inlet and the fluid outlet; and
   a solenoid including a solenoid casing and disposed between the fluid inlet and fluid outlet, the solenoid configured to move a valve member between a closed position, at least one partially open position, and a fully open position to selectively meter fluid flow through the fluid circuit, wherein the solenoid casing includes a blocking feature protruding therefrom and contacting the inner wall of the valve casing adjacent to the fluid inlet to form a single fluid path in the fluid circuit around a circumference of the solenoid such that the fluid flows around the circumference of the solenoid in one direction before entering a valve chamber housing the valve member; and
   a nozzle tip extending from the fluid valve downstream from the valve member, wherein the nozzle tip is configured to supply fluid to a turbomachine combustor.

15. The nozzle of claim 14, wherein the fluid valve further includes a valve casing, wherein the solenoid and valve member are disposed in the valve casing.

16. The nozzle of claim 1, wherein a thermal regulation portion of the fluid circuit is defined around at least a portion of the circumference of the solenoid to thermally regulate the solenoid.

17. The nozzle of claim 16, wherein the fluid circuit is defined more than 330 degrees around the solenoid.

18. The nozzle of claim 16, wherein the thermal regulation portion of the fluid circuit is defined by an inner wall of the valve casing and an outer wall of the solenoid casing.

* * * * *